United States Patent [19]
Nagoh et al.

[11] Patent Number: 5,879,591
[45] Date of Patent: Mar. 9, 1999

[54] PROCESS FOR PRODUCTION OF PHOTOCHROMIC CURED PRODUCT

[75] Inventors: Hironobu Nagoh; Kazumasa Itonaga; Satoshi Imura, all of Tokuyama, Japan

[73] Assignee: Tokuyama Corporation, Yamaguchi, Japan

[21] Appl. No.: 776,243

[22] PCT Filed: May 24, 1996

[86] PCT No.: PCT/JP96/01386

§ 371 Date: Jan. 24, 1997

§ 102(e) Date: Jan. 24, 1997

[87] PCT Pub. No.: WO96/37575

PCT Pub. Date: Nov. 28, 1996

[30] Foreign Application Priority Data

May 24, 1995 [JP] Japan ................................. 7/124920

[51] Int. Cl.$^6$ ........................................... G02B 5/23
[52] U.S. Cl. ........................................... 252/586
[58] Field of Search ................................. 252/582, 586

[56] References Cited

U.S. PATENT DOCUMENTS

| | | |
|---|---|---|
| 4,882,438 | 11/1989 | Tanaka et al. . |
| 4,960,678 | 10/1990 | Tanaka et al. . |
| 5,106,998 | 4/1992 | Tanaka et al. . |
| 5,130,058 | 7/1992 | Tanaka et al. . |
| 5,395,566 | 3/1995 | Kobayakawa et al. ............... 252/586 |
| 5,621,017 | 4/1997 | Kobayakawa et al. ............... 252/586 |

FOREIGN PATENT DOCUMENTS

| | | |
|---|---|---|
| 62-187784 | 8/1987 | Japan . |
| 62-288830 | 12/1987 | Japan . |
| 2-28154 | 1/1990 | Japan . |
| 3-11074 | 1/1991 | Japan . |
| 3-133988 | 6/1991 | Japan . |
| 3-261945 | 11/1991 | Japan . |
| 4-208919 | 7/1992 | Japan . |
| 4-358117 | 12/1992 | Japan . |
| 5-306392 | 11/1993 | Japan . |

OTHER PUBLICATIONS

Database WPI, Section Ch, Week 9349, Japanese Abstract, JP 05 295 358 A, Derwent Publications Ltd., London, GB; Class A89, AN 93–392954, Nov. 9, 1993.

*Primary Examiner*—Philip Tucker
*Attorney, Agent, or Firm*—Birch, Stewart, Kolasch & Birch, LLP

[57] ABSTRACT

A process for producing a photochromic cured product by allowing an unpurified, impurities-containing polyfunctional (meth)acrylate monomer such as unpurified polyalkylene glycol dimethacrylate and a photochromic spirooxazine compound to contain a compound having at least one epoxy group in the molecule such as glycidyl methacrylate and then polymerizing the resulting composition. The process can provide a spirooxazine-based photochromic cured product which hardy undergoes initial coloring and is superior in initial color-developing performance.

8 Claims, No Drawings

5,879,591

PROCESS FOR PRODUCTION OF PHOTOCHROMIC CURED PRODUCT

This application is a 371 of PCT/JP96/61386 filed May 24, 1996

TECHNICAL FIELD

The present invention relates to a process for producing a cured product superior in photochromism.

BACKGROUND ART

Photochromism is a phenomenon which has drawn attention in the last several years, and is a reversible reaction in which a certain compound quickly changes its color when irradiated with an ultraviolet-containing light such as sunlight or a light emitted from a mercury lamp and, when the light irradiation is stopped and the compound is placed in a dark room, returns the original color. Compounds capable of photochromism are called photochromic compounds, and photochromic compounds having various structures have heretofore been synthesized. These conventional photochromic compounds have poor durability.

There are known novel photochromic compounds having improved durability, such as spirooxazine-based photochromic compounds (hereinafter referred to simply as oxazine compound), fulgimide-based photochromic compounds (hereinafter referred to simply as fulgimide compound), chromene-based photochromic compounds (hereinafter referred to simply as chromene compound) and the like. [See U.S. Pat. Nos. 4,882,438, 4,960,678, 5,130,058 and 5,106,998; and Japanese Kokai (Laid-Open) Patent Application Nos. 62-288830, 2-28154, 3-11074 and 3-133988].

Also in Japanese Kokai (Laid-Open) Patent Application No. 5-306392 is proposed combination use of a compound having an epoxy group(s) as a component for further improving the durability of fulgide compound.

Japanese Kokai (Laid-Open) Patent Application No. 187784/1987 discloses a process for producing a photochromic resin, in which a highly reactive polyfunctional (meth)acrylate monomer is used and the concentration of polymerization initiator is specified, in order to prevent the degradation of an oxazine compound caused by polymerization initiator when the oxazine compound is mixed with and dissolved in a radically polymerizable monomer (hereinafter referred to simply as monomer) and curing is conducted in the presence of a polymerization initiator.

The above-mentioned photochromic compounds show excellent reversible durability. Among them, the oxazine compound is known as compound which generally hardly undergoes photodegradation, and when subjected to continuous irradiation with sunlight or a light similar thereto, shows a small reduction in initial color-developing performance and hence, exhibits excellent performance in light resistance. However, in order to easily produce a cured product by a method comprising mixing and dissolving the above photochromic compound and a monomer and subsequently subjecting to polymerization for curing (hereinafter referred to simply as a knead-mixing method) and use the cured product in various applications, it is necessary to develop a process for producing a cured product, in which the characteristic properties of the above oxazine compound can be exhibited fully.

For example, a cured product obtained by knead-mixing diethylene glycol bisallylcarbonate with the above-mentioned photochromic compound, which is widely used as a spectacle lens, has a problem in that the photochromic compound is degraded by the action of radical seed in curing and consequently, the cured product has a reduced initial color-developing performance.

In the process disclosed in Japanese Kokai (Laid-Open) Patent Application No. 62-187784 disclosing a method comprising curing a polyfunctional (meth)acrylate monomer and an oxazine compound at a polymerization initiator concentration specified in the literature by the knead-mixing method, a cured product capable of exhibiting sufficient photochromic performance can be obtained when a fully purified polyfunctional (meth)acrylate monomer is used. When a polyfunctional (meth)acrylate monomer generally available in the market and an oxazine compound are mixed, however, the resulting solution is strikingly colored, and when the solution is cured according to the process described in the literature, the resulting cured product not only is strikingly colored but also exhibits extraordinarily reduced color-developing performance.

As described above, a photochromic cured product produced according to the knead-mixing method, using an oxazine compound and an insufficiently purified commercial polyfunctional (meth)acrylate monomer has not exhibited satisfactory performance.

DISCLOSURE OF THE INVENTION

The present invention provides a process for producing a cured product having an excellent photochromic performance from an oxazine compound and a polyfunctional (meth)acrylate monomer available in the market, which is not purified in advance, by the simple knead-mixing method.

The present inventors made an extensive study on (1) preparation of a cured product by the knead-mixing method from an oxazine compound and a commercially available polyfunctional (meth)acrylate monomer which is used directly without subjecting to troublesome purification and on (2) production of photochromic cured product of excellent photochromic performance, typified by a spectacle lens. As a result, the present inventors found that in production of a photochromic cured product from a composition containing a polyfunctional (meth)acrylate monomer and an oxazine compound, when the composition is allowed to further contain a compound having at least one epoxy group in the molecule, incorporation of the oxazine compound into the polyfunctional (meth)acrylate monomer causes no striking coloring and the resulting photochromic cured product is almost free from initial coloring and superior in initial color-developing performance and durability in photochromism. The present invention has been accomplished based on the above finding.

That is, the present invention relates to a process for producing a photochromic cured product by polymerizing a composition containing a polyfunctional (meth)acrylate monomer, a photochromic spirooxazine compound and a polymerization initiator, wherein the composition is allowed to further contain a compound having at least one epoxy group in the molecule.

The polyfunctional (meth)acrylate monomer used in the present invention is such polyfunctional (meth)acrylate monomers available in the market that is difficult to industrially purify by distillation because they have a high boiling point at ordinary pressures and hence, cause polymerization when subjected to purification by distillation [this monomer is hereinafter referred to simply as polyfunctional (meth) acrylate]. General polyfunctional (meth)acrylates contain a trace amount of impurities such as those derived from raw material polyalcohol or from esterification, polymerization initiator and the like and, when an oxazine compound is mixed with and dissolved in such a polyfunctional (meth) acrylate, the resulting solution has striking coloring. When this colored solution is cured, the resulting cured product has striking coloring and is reduced in initial color-developing performance. However, when an epoxy compound is added to the above colored solution and then is stirred, the coloring is gradually reduced though the acting mechanism therefor is unknown, whereby there can be obtained a cured product free of coloring and having good color-developing performance. It is presumed that the trace amount of impurities contained in the polyfunctional (meth)acrylate exerts an action on the coloring in solution state and degradation during curing of the oxazine compound, based on a fact that when an oxazine compound is mixed with and dissolved in a distillation-purified monofunctional (meth)acrylate monomer (e.g. methyl methacrylate or benzyl methacrylate) having a structure similar to that of polyfunctional (meth) acrylates, or a sufficiently purified polyfunctional (meth) acrylate monomer, there occurs no striking coloring in the solution and that the resulting cured product exhibits sufficient initial photochromic performance. Further, when purification is not completely performed and removal of impurities is not sufficient, the resulting cured product has coloring and sufficient initial color-developing performance can not be achieved even though coloring in the solution state is not caused. Therefore, when a photochromic cured product is produced from a polyfunctional (meth)acrylate in the absence of an epoxy compound, the quality of the polyfunctional (meth)acrylate need to be of a high purity.

In the present production process and in the preparation of a composition by mixing the above components, individual components may be mixed in any order. However, when the oxazine compound and the polyfunctional (meth)acrylate are mixed first, the resulting solution has coloring and the oxazine compound in a colored state is liable to be degraded by the influence of a light or impurities such as oxygen or the like contained in the solution. It is preferable, therefore, to first mix the polyfunctional (meth)acrylate and the epoxy compound sufficiently and then add the oxazine compound thereto. Thereby, the striking coloring of the oxazine compound in the composition can be prevented.

The polyfunctional (meth)acrylate used in the present invention contains, as impurities, chemical substances capable of allowing an oxazine compound to have coloring. It includes a polyfunctional (meth)acrylate generally available in the market, which is a known polyfunctional (meth) acrylate not sufficiently purified.

Typical examples of the polyfunctional (meth)acrylate includes monomers represented by the following general formula (1):

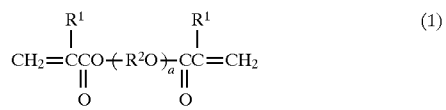

wherein $R^1$ is a hydrogen atom or a methyl group, $R^2$ is an alkylene group having 2 to 4 carbon atoms, and a is an integer of 1 to 10, monomers represented by the following formula (2):

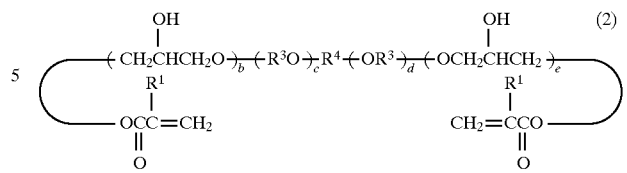

wherein $R^1$ is a hydrogen atom or a methyl group; $R^3$ is an ethylene group or a propylene group; b, c, d and e are each an integer of 0 to 10; when b, c, d or e is $$0, -(CH_2CHCH_2O)_b-, -(R^3O)_c-,$$
$$\underset{OH}{|}$$
$$-(OR^3)_d- \text{ or } -(OCH_2CHCH_2)_e-$$
$$\underset{OH}{|}$$

is a single bond; $R^4$ is an alkylene group having 3 to 10 carbon atoms or a group represented by the following formula

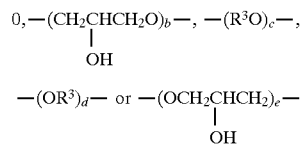

or

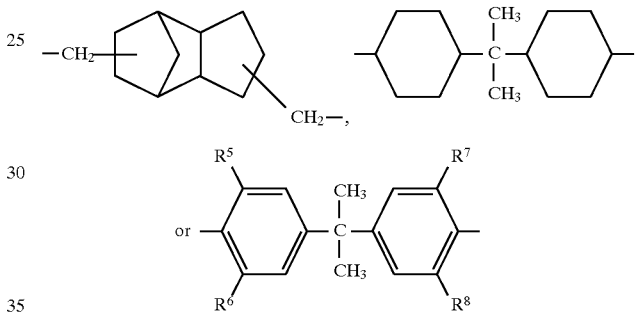

(in which $R^5$, $R^6$, $R^7$ and $R^8$ may be the same or different and are each a hydrogen atom or a halogen atom other than fluorine), and monomers represented by the following formula (3):

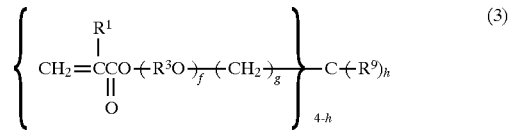

wherein $R^1$ is a hydrogen atom or a methyl group; $R^3$ is an ethylene group or a propylene group; f is an integer of 0 to 10; g is 0 or 1; when f or g is 0, $-(R^3O)_f-$ or $-(CH_2)_g-$ is a single bond; h is an integer of 0–2; $R^9$ is a hydrogen atom, a hydroxymethyl group or an alkyl group such as methyl, ethyl or the like).

Specific examples of the polyfunctional (meth)acrylates represented by the general formulas (1), (2) and (3) include ethylene glycol di(meth)acrylate, diethylene glycol di(meth) acrylate, triethylene glycol di((meth)acrylate, tetraethylene glycol di(meth)acrylate, polyethylene glycol di(meth) acrylate, propylene glycol di(meth)acrylate, dipropylene glycol di(meth)acrylate, tripropylene glycol di(meth) acrylate, tetrapropylene glycol di(meth)acrylate, polypropylene glycol di(meth)acrylate, polybutylene glycol di(meth) acrylate, 1,6-hexanediol di(meth)acrylate, neopentyl glycol di(meth)acrylate, acrylate or methacrylate compound of 2,2'-bis(4-methacryloyloxyethoxyphenyl)propane, acrylate or methacrylate compound of 2,2'-bis(4-methacryloyloxy polyethoxyphenyl)propane, acrylate or methacrylate compound of 2,2'-bis(4-methacryloyloxypropoxyphenyl)

propane, acrylate or methacrylate compound of 2,2'-bis(4-methacryloyloxypolypropoxyphenyl)propane, acrylate or methacrylate compound of 2,2'-bis[(3,5-dibromo-4-methacryloyloxyethoxy)propane, acrylate or methacrylate compound of addition product of hydrogenated bisphenol A with ethylene oxide or propylene oxide, dimethyloltricyclodecane di(meth)acrylate, dimethyloltricyclodecane polyethoxydi(meth)acrylate, trimethylolpropane tri(meth)acrylate, pentaerythritol tetra(meth)acrylate, a reaction product of ethylene glycol or polyethylene glycol and glycidyl (meth)acrylate, a reaction product of propylene glycol or polypropylene glycol and glycidyl (meth)acrylate, a reaction product of glycidyl (meth)acrylate and addition product of bisphenol A with ethylene oxide or propylene oxide, and a reaction product of glycidyl (meth)acrylate with addition product of hydrogenated bisphenol A with ethylene oxide or propylene oxide. These polyfunctional (meth)acrylates can be used singly or in combination of two or more. In the present invention, (meth)acrylate is a generic for methacrylate compound and acrylate compound.

As the compound having at least one epoxy group in the molecule (hereinafter referred to as epoxy compound) to be used in the present invention, any known compound can be used without limitation. It includes, for example, reaction products between epichlorohydrin and alcoholic hydroxyl group-containing compound such as mono-, di- or tri-hydric alcohol or phenolic hydroxyl group-containing compound such as phenol or hydroquinone, and reaction products between epichlorohydrin and carboxylic acid such as benzoic acid or terephthalic acid. Typical epoxy compounds can be represented by the following general formula (4).

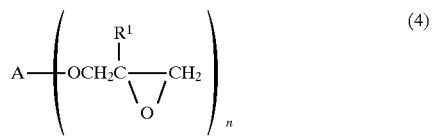

wherein A is a residue of an n-valent alcoholic hydroxyl group-containing compound, a residue of an n-valent phenolic hydroxyl group-containing compound, or a residue of an n-valent carboxylic acid; $R^1$ is a hydrogen atom or a methyl group; and n is an inter of 1 to 4.

The epoxy compound of the present invention preferably has further at least one unsaturated double bond group in the molecule. By using such a compound having an unsaturated double bond group and an epoxy group and polymerizing a composition containing the above compound and a photochromic compound to produce a photochromic cured product, the compound having at least one unsaturated double bond group and at least one epoxy group in the molecule is polymerized to form a polymer matrix to fix the compounds and in consequence, even though such a compound is used in a large amount, it does not impair the properties of the photochromic resin obtained.

Examples of the unsaturated double bond group includes a vinyl group, an allyl group, an acryloyl group and a methacryloyl group. An acryloyl group or a methacryloyl group is preferred to obtain a cured product of good photochromic properties.

As the epoxy compound having no unsaturated double bond group, there are mentioned compounds of the above general formula in which n is 1 or 2 and A is, when n is 1, an alkyl group of 2 to 20 carbon atoms which may be substituted with a hydroxyl group(s), a group represented by —R—(OR)$_m$—OH (in which R is an alkylene group of 2 to 4 carbon atoms, and m is an integer of 1 to 20), a cycloalkyl group of 6 to 7 carbon atoms which may be substituted with a hydroxyl group(s), a phenyl group which may be substituted with a hydroxyl group(s), or a benzoyl group which may be substituted with a carboxyl group(s); and when n is 2, an alkylene group of 2 to 20 carbon atoms which may be substituted with a hydroxyl group(s), a group represented by —R—(OR)$_m$— (in which R is an alkylene group of 2 to 4 carbon atoms, and m is an integer of 1 to 20), a cycloalkylene group of 6 to 7 carbon atoms which may be substituted with a hydroxyl group(s), a phenylene group which may be substituted with a hydroxyl group(s), a phthaloyl, isophthaloyl or terephthaloyl group which may be substituted with a hydroxyl group(s), or a group represented by the following formula:

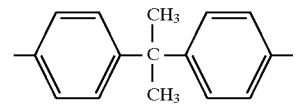

As the epoxy compound having at least one unsaturated double bond group, there can be mentioned compounds represented by the following general formula (5) which are typical compounds preferably used in the present invention:

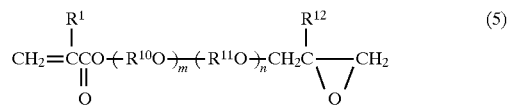

wherein $R^1$ and $R^{12}$ are each a hydrogen atom or a methyl group; $R^{10}$ and $R^{11}$ may be the same or different and are each an alkylene group of 1 to 4 carbon atoms which may be substituted with a hydroxyl group(s), or a group represented by the following formula

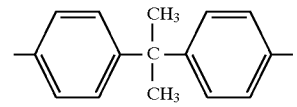

and m and n are each 0 or 1.

In the above formula, the alkylene group represented by $R^{10}$ can be exemplified by methylene group, ethylene group, propylene group, butylene group, trimethylene group and tetramethylene group.

Specific examples of the epoxy compound preferably usable in the present invention are as follows.

Examples of the compound having, in the molecule, at least one epoxy group but no unsaturated double bond group are ethylene glycol glycidyl ether, propylene glycol glycidyl ether, glycerol polyglycidyl ether, diglycerol polyglycidyl ether, sorbitol polyglycidyl ether, butyl glycidyl ether, phenyl glycidyl ether, polyethylene glycol diglycidyl ether, polypropylene glycol diglycidyl ether, neopentyl glycol diglycidyl ether, 1,6-hexanediol diglycidyl ether, adduct of propylene oxide to bisphenol A or hydrogenated bisphenol A, diglycidyl terephthalate, spiroglycol diglycidyl ether and hydroquinone diglycidyl ether.

Examples of the compound having, in the molecule, at least one epoxy group and at least one unsaturated double bond group are acrylate or methacrylate compounds such as glycidyl acrylate, glycidyl methacrylate, β-methylglycidyl acrylate, β-methylglycidyl methacrylate, bisphenol A-monoglycidyl ether methacrylate, 4-glycidyloxybutyl methacrylate, 3-(glycidyl-2-oxyethoxy)-2-hydroxypropyl methacrylate, 3-(glycidyloxy-1-isopropyloxy)-2-hydroxypropyl acrylate, 3-(glycidyloxy-2-hydroxypropyloxy)-2-hydroxypropyl acrylate and the like.

In the composition of the present invention, the amount of the epoxy compound used cannot be specified generally because it varies depending upon the amount of the impurities contained in the polyfunctional (meth)acrylate. When a general polyfunctional (meth)acrylate in the market is used, use of the epoxy compound in an amount of 1 part by weight or more per 100 parts by weight of the whole monomer can suppress the coloring of the cured product obtained. Generally, even if up to 30 parts by weight of an epoxy compound is blended, a cured product of sufficient strength can be obtained. In the case of an epoxy compound having no unsaturated double bond group, however, it is used in an amount of preferably 1 to 10 parts by weight, more preferably 1 to 5 parts by weight, per 100 parts by weight of the whole monomer because too large an amount of such compound prevent curing of a cured product.

The above-mentioned whole monomer refer to the compounds having an epoxy group(s) and/or an unsaturated double bond group(s), capable of giving rise to radical polymerization, and includes all of the polyfunctional (meth)acrylate, the epoxy compound and other monomer added as necessary (described later). The same applies hereinafter.

The oxazine compound used in the present invention can be any known compound having a spirooxazine skeleton and having photochromic properties. It is preferably a spirooxazine compound represented by the following general formula (6):

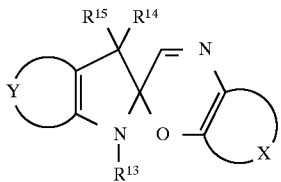

In the above general formula (6), $R^{13}$, $R^{14}$ and $R^{15}$ may be the same or different and are each an alkyl group, a cycloalkyl group, a cycloaralkyl group, an alkoxy group, an alkyleneoxyalkyl group, an alkoxycarbonyl group, an alkoxycarbonylalkyl group, an aryl group, an aralkyl group, an aryloxy group, an alkylenethioalkyl group, an acyl group, an acyloxy group or an amino group, $R^{14}$ and $R^{15}$ may together form a ring, and $R^{13}$, $R^{14}$ and $R^{15}$ may each have a substituent(s). The substituent(s) includes (include), besides the above-mentioned groups, halogen atom, nitro group, cyano group, heterocyclic group and the like. The group represented by

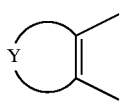

is a substituted or unsubstituted bivalent aromatic hydrocarbon group or a substituted or unsubstituted bivalent unsaturated heterocyclic group. The group represented by

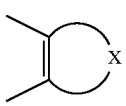

is a substituted or unsubstituted bivalent aromatic hydrocarbon group or a substituted or unsubstituted bivalent unsaturated heterocyclic group. The bivalent aromatic hydrocarbon or bivalent unsaturated heterocyclic group includes, for example, bivalent groups derived from a benzene ring or from a fused ring of 2 or 3 benzene rings. The bivalent unsaturated heterocyclic ring includes, for example, bivalent groups derived from a 5- to 7-membered ring containing 1 or 2 oxygen, nitrogen or sulfur atoms as the ring-forming atom(s), or from a fused ring of the above 5- to 7-membered ring and a benzene ring.

Specific examples of the bivalent aromatic hydrocarbon group are groups of 6 to 14 carbon atoms derived from benzene ring, naphthalene ring, phenanthrene ring, anthracene ring or the like. Specific examples of the bivalent unsaturated heterocyclic group are groups of 4 to 9 carbon atoms derived from furan ring, benzofuran ring, pyridine ring, quinoline ring, isoquinoline ring, pyrrole ring, thiophene ring, thiophene ring, benzothiophene ring or the like. The substituents can be selected from the same groups as mentioned above with respect to $R^{13}$, $R^{14}$ and $R^{15}$. In particular, an oxazine compound substituted with a group represented by

—$NR^{16}R^{17}$ wherein $R^{16}$ and $R^{17}$ are each an alkyl group, an alkoxy group, an allyl group or the like, each of which may be substituted; and $R^{16}$ and $R^{17}$ may be bonded and cyclized with each other to form a nitrogen-containing heterocyclic ring, is preferable from the standpoint of high density of its developed color in the initial photochromic performance.

Specific examples of the oxazine compound, preferably usable in the present invention are as follows.

(1) 6'-Fluoro-1'-methyl-8"-methoxy-6"-morpholinodispiro-(cyclohexane-1,3'-(3H)indole-2'-(2H),3"-(3H)naphtho(3,2a)(1,4)oxazine)

(2) 1'-Methoxycarbonylmethyl-8"-methoxy-6"-(4-methylpiperazino)dispiro(cyclohexane-1,3'-(3H)indole-2'-(2H),3"-(3H)naphtho(3,2-a)(1,4)oxazine)

(3) 5'-Fluoro-1'-methyl-6"-piperidinodispiro(cyclohexane-1,3'-(3H)indole-2'-(2H),3"-(3H)naphtho(3,2-a)(1,4)oxazine)

(4) 1'-Methyl-8"-methoxydispiro(cyclohexane-1,3'-(3H)indole-2'-(2H),3"-(3H)naphtho(2,3-a)(1,4)oxazine)

(5) 6'-Fluoro-1',7'-dimethyl-6"-morpholinodispiro(cyclohexane-1,3'-(3H)indole-2'-(2H),3"-(3H)naphtho(3,2-a)(1,4)oxazine)

(6) 6'-Fluoro-1',5'-dimethyl-6"-morpholinodispiro(cyclohexane-1,3'-(3H)indole-2'-(2H),3"-(3H)naphtho(3,2-a)(1,4)oxazine)

(7) 6'-Fluoro-1'-isobutyl-6"-morpholinodispiro(cyclohexane-1,3'-(3H)indole-2'-(2H),3"-(3H)naphtho(3,2-a)(1,4)oxazine)

(8) 6'-Fluoro-5'-methyl-1'-isobutyl-6"-morpholinodispiro(cyclohexane-1,3'-(3H)indole-2'-(2H),3"-(3H)naphtho(3,2a)(1,4)oxazine)

(9) 6'-Fluoro-5'-methyl-1'-neopentyl-6"-morpholinodispiro(cyclohexane-1,3'-(3H)indole-2'-(2H), 3"-(3H)naphtho(3,2a)(1,4)oxazine)

(10) 1',3',3'-Trimethyl-6"-piperinospiro((3H)indole-2'-(2H), 3"-(3H)naphtho(3,2-a)(1,4)oxazine)

(11) 3',3'-Dimethyl-1'-isobutyl-spiro((3H)indole-2'-(2H),3"-(3H)naphtho(3,2-a)(1,4)oxazine)

(12) 1',3',3'-Trimethyl-spiro((3H)indole-2'-(2H),3"-(3H)naphtho(3,2-a)(1,4)oxazine)

In the present invention, by containing the epoxy compound in the composition, coloring of the oxazine compound does not occur, the composition shows reduced coloring and the cured product has improved initial color-developing performance. Therefore, the amount of the oxazine compound used can be determined from a wide range. However, when the amount of the oxazine compound is too small, no sufficient initial color-developing performance is obtained, while the amount is too large, the oxazine compound causes cohesion, resulting in sharp reduction in durability of photochromic properties. Hence, the oxazine compound is used in an amount of preferably 0.001 to 10 parts by weight, more preferably 0.01 to 5 parts by weight, particularly preferably 0.01 to 1 part by weight, per 100 parts by weight of the whole monomer.

In the present invention, by using other two types of photochromic compounds, i.e. a chromene compound and a fulgide compound in combination with the oxazine compound, there can be obtained a photochromic cured product of higher degree of completeness suited for the intended application. For example, it is known that oxazine compounds mainly develop a blue-line color, but when it is intended to use a photochromic cured product obtained by the present invention for obtaining a spectacle lens having a neutral color of gray or brown, a cured product capable of developing a neutral gray or brown color and superior in durability can be produced by combination use of a chromene compound and a fulgimide compound with the oxazine compound. The chromene compound is a compound mainly developing a yellow color and is needed to procure a neutral color in combination with a blue color and the fulgimide compound develop a blue color similarly to the oxazine compound, but show wider absorption for visible light than the oxazine compound. Accordingly, it is possible to obtain a deeper color. As the above fulgide compound and chromene compound, there can be suitably used known compounds described in, for example, U.S. Pat. Nos. 4,882,438, 4,960,678, 5,130,058, 5,106,998 and the other.

The fulgide-based photochromic compounds suitably used in the present invention can be represented by the following general formula (7):

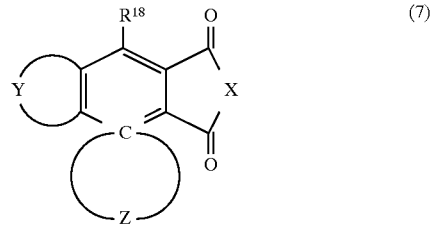

(7)

wherein the group represented by the following formula

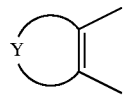

is a substituted or unsubstituted bivalent aromatic hydrocarbon group or a substituted or unsubstituted bivalent unsaturated heterocyclic group; $R^{18}$ is an alkyl group, an aryl group, a cyclopropyl group which may be substituted, or a monovalent heterocyclic group; the group represented by the following formula:

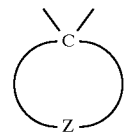

is a norbornylidene group or an adamantylidene group; and X is an oxygen atom, a group represented by $>N-R^{19}$, a group represented by $>N-A_1-B_1-(A_2)_k-(B_2)_l-R^{20}$, a group represented by $>N-A_3-A_4$ or a group represented by $>N-A_3-R^{21}$ (in which $R^{19}$ is a hydrogen atom, an alkyl group or an aryl group; $R^{20}$ is an alkyl group, a naphthyl group or a naphthylalkyl group; $R^{21}$ is a halogen atom, a cyano group or a nitro group; $A_1$, $A_2$ and $A_3$ may be the same or different and are each an alkylene group, an alkylidene group, a cycloalkylene group or an alkylcycloalkan-diyl group; $A_4$ is a naphthyl group; $B_1$ and $B_2$ may be the same or different and are each a group represented by the following group:

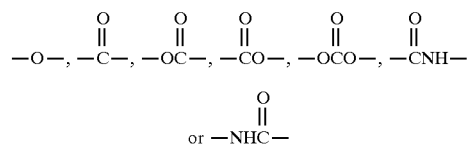

and k and l are each independently 0 or 1 with a proviso that when k is 0, l is 0)].

In the general formula (7), the bivalent aromatic hydrocarbon group represented by the following formula:

includes, for example, bivalent groups derived from a benzene ring or from a fused ring of 2 or 3 benzene rings. The bivalent unsaturated heterocyclic ring includes, for example, bivalent groups derived from a 5- to 7-membered ring containing 1 or 2 oxygen, nitrogen or sulfur atoms as the ring-forming atom(s), or from a fused ring of the above 5- to 7-membered ring and a benzene ring.

Specific examples of the bivalent aromatic hydrocarbon group are groups of 6 to 14 carbon atoms derived from benzene ring, naphthalene ring, phenanthrene ring, anthracene ring or the like. Specific examples of the bivalent unsaturated heterocyclic group are groups of 4 to 9 carbon atoms derived from furan ring, benzofuran ring, pyridine ring, quinoline ring, isoquinoline ring, pyrrole ring, thiophene ring, thiophene ring, benzothiophene ring or the like. The bivalent aromatic hydrocarbon group or bivalent unsaturated heterocyclic group may have a substituent(s). The substituent(s) is (are) not particularly restricted and can be exemplified by halogen atoms such as chlorine, bromine, iodine and the like; alkyl groups of 1 to 4 carbon atoms such as methyl group, ethyl group and the like; alkoxy groups of 1 to 4 carbon atoms such as methoxy group, ethoxy group and the like; aryl groups of 6 to 10 carbon atoms such as phenyl group, tolyl group, xylyl group and the like; alkoxyaryl groups of 7 to 14 carbon atoms (aryl groups of 6 to 10 carbon atoms each substituted with an alkoxy group of 1 to 4 carbon atoms); amino group; nitro group; and cyano group.

In the general formula (7), the alkyl group, aryl group and heterocyclic group represented by $R^{18}$ can be exemplified by the same groups as mentioned with respect to the above substituents, and include alkyl groups of 1 to 4 carbon atoms, aryl groups of 6 to 10 carbon atoms, and monovalent groups each derived from a 5- to 7-membered ring containing 1 or 2 oxygen, nitrogen or sulfur atoms as the ring-forming atom(s), or from a fused ring of the above 5- to 7-membered ring and a benzene ring.

The alkyl group and aryl group represented by $R^{19}$ when X is a nitrogen-containing group, can be exemplified by the same groups as mentioned with respect to $R^{18}$. The alkylene group represented by $A_1$, $A_2$ and $A_3$ when X is a nitrogen-containing group, is preferably a group of 1 to 4 carbon atoms such as methylene group, ethylene group, propylene group, trimethylene group, tetramethylene group or the like; the alkylidene group is preferably a group of 2 to 4 carbon atoms such as ethylidene group, propylidene group, isopropylidene group or the like; the cycloalkylene group is preferably a cyclohexylene group; and the alkylcycloalkan-diyl group is preferably a dimethylcyclohexan-diyl group. The alkyl group represented by $R^{20}$ is the same as mentioned with respect to $R^{18}$; and the naphthylalkyl group is preferably a group of 11 to 14 carbon atoms such as naphthylmethyl group, naphthylethyl group or the like.

Of the fulgide-based photochromic compounds represented by the general formula (7), there is preferred, in view of the durability in photochromism, etc., a compound of the formula (7) in which $R^{18}$ is an alkyl group or a cyclopropyl group; X is >N—R [in which R is a cyanoalkyl group of 1 to 4 carbon atoms, a nitroalkyl group of 1 to 4 carbon atoms or an alkoxycarbonylalkyl group of 3 to 9 carbon atoms (containing an alkoxy group of 1 to 4 carbon atoms and an alkylene group of 1 to 4 carbon atoms), the group represented by the following formula:

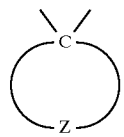

is an adamantylidene group, and the group represented by the following formula:

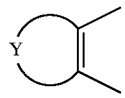

is a heterocyclic group which may be substituted with an aryl group of 6 to 10 carbon atoms or an alkoxyaryl group of 7 to 14 carbon atoms (an aryl group of 6 to 10 carbon atoms substituted with an alkoxy group of 1 to 4 carbon atoms), particularly a group derived from a thiophene ring.

The chromene compounds suitably used in the present invention can be represented by the following general formula (8):

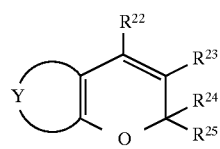

(8)

wherein $R^{22}$, $R^{23}$, $R^{24}$ and $R^{25}$ may be the same or different and are each a hydrogen atom, an alkyl group, an aryl group, a substituted amino group or a saturated heterocyclic group and $R^{24}$ and $R^{25}$ may form a ring together; and the group represented by the following formula:

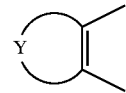

is a substituted or unsubstituted bivalent aromatic hydrocarbon group or a substituted or unsubstituted bivalent unsaturated heterocyclic group.

In the general formula (8), the alkyl group and aryl group represented by $R^{22}$, $R^{23}$, $R^{24}$ and $R^{25}$ can be the same alkyl groups and aryl groups as mentioned with respect to the general formula (7); the substituted amino group includes amino groups in which at least one of the hydrogen atoms is substituted with the above-mentioned alkyl group(s) or aryl group(s); the saturated heterocyclic group includes monovalent groups each derived from a 5- to 6-membered ring containing, as a ring-forming atom, 1 or 2 nitrogen, oxygen or sulfur atoms, such as pyrrolidine ring, imidazolidine ring, piperidine ring, piperazine ring, morpholine ring or the like.

In the general formula (8), the ring which $R^{24}$ and $R^{25}$ form together includes a norbornylidene group, a bicyclo[3.3.1]9-nonylidene group, etc.

In the general formula (8), the bivalent aromatic hydrocarbon group or bivalent unsaturated heterocyclic group represented by the following formula:

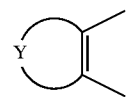

can be exemplified by the same groups as mentioned with respect to the general formula (7). These groups may each have a substituent(s). The substituent(s) is (are) not particularly restricted and can be exemplified by halogen atoms such as chlorine, bromine, iodine and the like; alkyl groups of 1 to 20 carbon atoms such as methyl group, ethyl group and the like; alkoxy groups of 1 to 20 carbon atoms such as methoxy group, ethoxy group and the like; aryl groups of 6 to 10 carbon atoms such as phenyl group, tolyl group, xylyl group and the like; amino group; nitro group; and cyano group.

Of the above-mentioned chromene-based photochromic compounds, particularly suitable is a compound of general formula (8) in which $R^{22}$ and $R^{23}$ are each a hydrogen atom; $R^{24}$ and $R^{25}$ may be the same or different and are each an alkyl group of 1 to 4 carbon atoms, or may together form a bicyclo[3.3.1]-nonylidene group or a norbornylidene group; and the group represented by the following formula

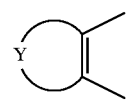

is a group derived from a naphthalene ring which may be substituted with an alkyl group(s) of 1 to 20 carbon atoms or an alkoxy group(s) of 1 to 20 carbon atoms.

Specific examples of the fulgide compound and chromene compound, which can be suitably used in the present invention, are as follows.

Fulgide compounds
(1) N-cyanomethyl-6,7-dihydro-4-methyl-2-phenylspiro(5,6-benzo[b]thiophenedicarboxyimido-7,2-tricyclo[3.3.1.1]decane)

(2) N-cyanomethyl-6,7-dihydro-2-(p-methoxyphenyl)-4-methylspiro(5,6-benzo[b]thiophenedicarboxyimido-7,2-tricyclo[3.3.1.1]decane)
(3) N-cyanomethyl-6,7-dihydro-4-methylspiro(5,6-benzo[b]thiophenedicarboxyimido-7,2-tricyclo-[3.3.1.1]decane)
(4) 6,7-dihydro-N-methoxycarbonylmethyl-4-methyl-2-phenylspiro(5,6-benzo[b]thiophenedicarboxyimido-7,2-tricyclo[3.3.1.1]decane)
(5) 6,7-dihydro-4-methyl-2-(p-methylphenyl)-N-nitromethylspiro(5,6-benzo[b]thiophenedicarboxyimido-7,2-tricyclo[3.3.1.1]decane)
(6) N-cyanomethyl-6,7-dihydro-4-cyclopropyl-3-methyl-spiro(5,6-benzo[b]thiophenedicarboxyimido-7,2-tricyclo[3.3.1.1]decane)
(7) N-cyanomethyl-6,7-dihydro-4-cyclopropyl-spiro(5,6-benzo[b]thiophenedicarboxyimido-7,2-tricyclo[3.3.1.1]decane)

Chromene compounds
(1) spiro[norbornane-2,2'-[2H]benzo[h]chromene]
(2) spiro[bicyclo[3.3.1]nonane-9,2'-[2H]benzo[h]chromene]
(3) 7'-methoxyspiro[bicyclo[3.3.1]nonane-9,2'-[2H]benzo[h]chromene]
(4) 7'-methoxyspiro[norbornane-2,3'-[3H]benzo[f]chromene]
(5) 2,2-dimethyl-7-octoxy[2H]benzo[h]chromene In the present invention, the chromene or fulgide compound is used in the range of generally 0.001 to 10 parts by weight, preferably 0.01 to 1 part by weight per 100 parts by weight of the whole monomer. In this range, the best photochromic performance can be achieved.

In the present invention, in addition to the polyfunctional (meth)acrylate, other known unsaturated monomers can be added, as required, to obtain a cured product. Examples of other monomer suitably used are monofunctional (meth)acrylates such as methyl (meth)acrylate, ethyl (meth)acrylate, butyl (meth)acrylate, isobornyl (meth)acrylate, benzyl (meth)acrylate, phenyl (meth)acrylate, tribromophenyl (meth)acrylate, 2-hydroxyethyl (meth)acrylate, phenoxyethyl (meth)acrylate, phenoxypolyethylene glycol (meth)acrylate, alkoxypolyethylene glycol (meth)acrylate, alkoxypolypropylene glycol (meth)acrylate and the like; and aromatic vinyl compounds such as styrene, chlorostyrene, α-methylstyrene dimer, vinylnaphthalene, isopropenylnaphthalene, bromostyrene, divinylbenzene and the like. These monomers can be used in the composition of the present invention singly or in combination of two or more. The amount of other monomer used can be determined depending upon the application of the resulting cured product, but is generally 0.5 to 80 parts by weight and, in view of the heat resistance of the resulting photochromic resin, 0.5 to 30 parts by weight per 100 parts by weight of the whole monomer.

The polymerization initiator used in the present invention is not particularly limited and a known polymerization initiator may be used. Typical examples thereof are diacyl peroxides such as benzoyl peroxide, p-chlorobenzoyl peroxide, decanoyl peroxide, lauryl peroxide, acetyl peroxide and the like; peroxy esters such as t-butyl peroxy-2-ethylhexanoate, t-butyl peroxyneodecanoate, cumyl peroxyneodecanoate, t-butyl peroxybenzoate and the like; percarbonates such as diisopropyl peroxydicarbonate, di-sec-butyl peroxydicarbonate and the like; and azo compounds such as azobisisobutyronitrile and the like.

The amount of the polymerization initiator used varies depending upon the polymerization conditions employed, the kinds of initiator used and the composition of monomers used, and cannot be specified generally. However, the suitable amount is generally 0.001 to 10 parts by weight, preferably 0.01 to 5 parts by weight, per 100 parts by weight of the whole monomer.

The polymerization process for obtaining a cured product from the polymerizable composition of the present invention is not particularly limited, and a known radical polymerization process can be used. The polymerization can be initiated by the use of a variety of radical polymerization initiators such as peroxides, azo compounds or the like, or by irradiation of ultraviolet light, α-ray, β-ray, γ-ray or the like, or by the combination use of the above two means. As the typical polymerization process, cast polymerization can be employed; that is, the photochromic composition of the present invention containing a radical polymerization initiator is poured into a mold held by an elastomer gasket or spacer, the mold is placed in a heating furnace to carry out polymerization of the composition, and then the resulting polymer is taken out.

Of the polymerization conditions, the polymerization temperature, in particular, exerts an influence on the properties of the photochromic cured product to be obtained. The temperature condition varies depending upon the kind and amount of initiator used and the kinds of monomers used and cannot be specified generally. However, it is generally preferred to conduct so-called tapered type two-stage polymerization wherein polymerization is initiated at a relatively low temperature, the temperature is increased gradually and, upon the completion of polymerization, curing is conducted at a high temperature. The polymerization time also varies depending upon various factors similarly to the polymerization temperature. Therefore, it is preferred to determine, in advance, an optimum polymerization time to meet the conditions, while it is preferable that the conditions are selected so as to complete the polymerization generally in 2 to 40 hours.

In the polymerization, it is of course possible to add, as necessary, various stabilizers and additives such as mold-releasing agent, ultraviolet absorber, ultraviolet stabilizer, antioxidant, coloring inhibitor, antistatic agent, fluorescent dye, dye, pigment, odorant or the like.

In the photochromic composition of the present invention, addition of the ultraviolet stabilizer is preferred because the durability of the photochromic compound used in the composition can be further improved thereby. Particularly, a fulgide compound shows large improvement in durability by the presence of an ultraviolet stabilizer and hence, in the case where a mixture of the aforesaid oxazine compound, fulgide compound and chromene compound is used, addition of an ultraviolet stabilizer serves to favorably prevent the neutral color developed by these compounds from changing with time.

As the ultraviolet stabilizer, there can be preferably used a hindered amine light stabilizer, a hindered phenol light stabilizer, a sulfur-based antioxidant and a phosphorous acid ester compound. Particularly preferred is a hindered amine light stabilizer having a hindered amine structure in the molecule.

The amount of the ultraviolet stabilizer used is not particularly restricted, but a preferable amount is generally 0.01 to 5 parts by weight, preferably 0.02 to 1 part by weight, per 100 parts by weight of the whole monomer.

When an infrared absorber is used in the present composition, there can be obtained a photochromic cured product having not only photochromism but also infrared absorptivity. There can be used, as the infrared absorber, a polymethine compound, a diimmonium compound, a cyanine compound, ananthraquinone compound and an aluminum compound. A diimmonium compound is preferred because it has a high molecular absorptivity coefficient and can show an effect in a small amount.

The amount of the infrared absorber used is preferably 0.0001 to 1 part by weight, more preferably 0.001 to 0.01 part by weight, per 100 parts by weight of the whole monomer.

The photochromic cured product obtained as above can be subjected to the following treatments, depending upon the application. That is, to the cured product can be applied processing and secondary treatments such as dyeing by the use of a dye such as dispersed dye or the like; a treatment by a silane coupling agent or a hard-coat agent containing, as the main component, a sol of silicon, zirconium, antimony, aluminum, tin, tungsten or the like; an anti-reflection treatment by formation of a thin film of a metal oxide (e.g. $SiO_2$, $TiO_2$ or $ZrO_2$) by vapor deposition; an antistatic treatment by coating of a thin film of an organic polymer; and so forth.

The present process can produce a photochromic cured product which is almost free of initial coloring and superior in initial color-developing performance and durability of photochromic properties. The present invention has made it possible to produce a photochromic cured product containing an oxazine compound, which is a thermosetting resin usable as a photochromic lens or the like, by the simple knead-mixing method.

EXAMPLES

The present invention is hereinafter explained specifically by way of Examples. However, the present invention is not restricted to these Examples.

The compounds used in the following Examples are as follows.

[Compounds having at least one epoxy group in the molecule]
GMA: glycidyl methacrylate
GA: glycidyl acrylate
MGMA: β-methylglycidyl dimethacrylate
MGA: β-methylglycidyl acrylate
BPMGMA: bisphenol A-monoglycidyl ether methacrylate
GBMA: 4-glycidyloxybutyl methacrylate
GEHPMA: 3-(glycidyl-2-oxyethoxy)-2-hydroxypropyl methacrylate
GIHPA: 3-(glycidyloxy-1-isopropyloxy)-2-hydroxypropylacrylate
EGGE: ethylene glycol glycidyl ether
PGGE: propylene glycol glycidyl ether
FDGE: diglycidyl terephthalate
HDGE: hydroquinone diglycidyl ether
BGE: butyl glycidyl ether
HDGE: 1,6-hexanediol diglycidyl ether

[Polyfunctional (meth)acrylates]
3G: triethylene glycol dimethacrylate [NK Ester 3G (trade name), a product of Shin-Nakamura Chemical Co., Ltd.]
4G: tetraethylene glycol dimethacrylate (a monomer mixture of polyethylene glycol having four (on an average) moles of ethylene oxide chains [NK Ester 4G (trade name), a product of Shin-Nakamura Chemical Co., Ltd.]
3PG: tripropylene glycol dimethacrylate [NK Ester 3PG (trade name), a product of Shin-Nakamura Chemical Co., Ltd.]
4PG: tetrapropylene glycol dimethacrylate (a monomer mixture of polypropylene glycol having four (on an average) moles of propylene oxide chains [NK Ester 4PG (trade name), a product of Shin-Nakamura Chemical Co., Ltd.]
BP-2EM: 2,2'-bis(4-methacryloyloxypolyethoxyphenyl)-propane methacrylate (a mixture having 2.2 (on an average) moles of ethylene oxide chains) [Light Ester BP-2EM (trade name), a product of Kyoeisha Chemical Co., Ltd.]
BR-MA: 2,2'-bis[(3,5-dibromo-4-methacryloyloxy-ethoxy)-propane methacrylate [Light Ester BR-MA (trade name), a product of Kyoeisha Chemical Co., Ltd.]
TEGDMA: triethylene glycol dimethacrylate [TEGDMA (trade name), a product of Mitsubishi Gas Chemical Co., Ltd.]
3EG: triethylene glycol dimethacrylate [Light Ester 3EG (trade name), a product of Kyoeisha Chemical Co., Ltd.]
PRO-631: 2,2'-bis(4methacryloyloxypolyethoxyphenyl)-propane methacrylate [PRO-631 (trade name), a product of Sartomer Co., Ltd.]

[Other monomers]
MMA: methyl methacrylate
MS: α-methylstyrene
MSD: α-methylstyrene dimer
BzMA: benzyl methacrylate
HEMA: 2-hydroxyethyl methacrylate

[Purified polyfunctional (meth)acrylates]
P1-3G: triethylene glycol dimethacrylate [NK Ester 3G (trade name), a product of Shin-Nakamura Chemical Co., Ltd.] washed twice each with a 1N aqueous hydrochloric acid solution, a 10% (by weight) aqueous sodium carbonate solution and pure water.
P2-3G: 20 g of triethylene glycol dimethacrylate which was first fractioned out of the colume when 500 g of triethylene glycol dimethacrylate [NK Ester 3G (trade name), a product of Shin-Nakamura Chemical Co., Ltd.] was passed through a column filled with alumina.

[Spirooxazine compounds]
SP1: 6'-fluoro-1'-methyl-8"-methoxy-6"-morpholino-dispiro(cyclohexane-1,3'-(3H)indole-2'-(2H),3"-(3H) naphtho(3,2a)(1,4)oxazine)
SP2: 1'-methoxycarbonylmethyl-8"-methoxy-6"-(4-methylpiperazino)dispiro(cyclohexane-1,3'-(3H)indole-2'-(2H),3"-(3H)naphtho(3,2a)(1,4)oxazine)
SP3: 5'-fluoro-1'-methyl-6"-piperidinodispiro(cyclohexane-1,3'-(3H)indole-2'-(2H),3"-(3H)naphtho (3,2-a)(1,4)oxazine)
SP4: 1'-methyl-8"-methoxydispiro(cyclohexane-1,3'-(3H) indole-2'-(2H),3"-(3H)naphtho(2,3-a)(1,4)oxazine)
SP5: 6'-fluoro-1',7'-dimethyl-6"-morpholinodispiro (cyclohexane-1,3'-(3H)indole-2'-(2H),3"-(3H)naphtho(3, 2-a)(1,4)oxazine)
SP6: 6'-fluoro-1',5'-dimethyl-6"-morpholinodispiro (cyclohexane-1,3'-(3H)indole-2'-(2H),3"-(3H)naphtho(3, 2-a)(1,4)oxazine)
SP7: 6'-fluoro-1'-isobutyl-6"-morpholinodispiro-(cyclohexane-1,3'-(3H)indole-2'-(2H),3"-(3H)naphtho(3, 2-a)(1,4)oxazine)
SP8: 6'-fluoro-5'-methyl-1'-isobutyl-6"-morpholinodispiro (cyclohexane-1,3'-(3H-)indole-2'-(1'H),3"-(3H)naphtho (3,2a)(2H)oxazine)
SP9: 6'-fluoro-5'-methyl-1'-neopentyl-6"-morpholinodispiro (cyclohexane-1,3'-(3H)indole-2'-(2H),3"-(3H)naphtho(3, 2a)(1,4)oxazine)
SP10: 1',3',3'-trimethyl-6"-piperidinospiro ((3H)indole-2'-(2H),3"-(3H)naphtho(3,2-a)(1,4)oxazine)
SP11: 3',3'-dimethyl-1'-isobutyl-spiro((3H)indole-2'-(2H), 3"-(3H)naphtho(3,2-a)(1,4)oxazine)
SP12: 1',3',3'-trimethyl-spiro((3H)indole-2'-(2H),3"-3H) naphtho(3,2-a)(1,4)oxazine)

[Fulgide compounds]
F1: N-cyanomethyl-6,7-dihydro-4-methyl-2-phenylspiro(5, 6-benzo[b]thiophenedicarboxyimido-7,2-tricyclo [3.3.1.1]-decane)
F2: N-cyanomethyl-6,7-dihydro-2-(p-methoxyphenyl)-4-methylspiro(5,6-benzo[b]thiophenedicarboxyimido-7,2-tricyclo[3.3.1.1]decane)
F3: N-cyanomethyl-6,7-dihydro-4-methylspiro(5,6-benzo [b]thiophenedicarboxyimido-7,2-tricyclo[3.3.1.1]decane)

[Chromene compounds]
C1: spiro[norbornane-2,2'-[2H]benzo[h]chromene]
C2: spiro[bicyclo[3.3.1]nonane-9,2'-[2H]benzo[h] chromene]

C3: 7'-methoxyspiro[bicyclo[3.3.1.]nonane-9,2'-[2H]benzo[h]chromene]

Example 1

Various epoxy compounds and monomers [polyfunctional (meth)acrylates and other monomers] shown in Table 1 were each stirred at room temperature for 2 hours. To the resulting solution were added 0.04 part by weight of an oxazine compound [SP5: 6'-fluoro-1',7'-dimethyl-6"-morpholinodispiro(cyclohexane-1,3'-(3H)indole-2'-(1'H), 3"-(3H)naphtho(3,2-a)(1,4)oxazine)] and 1 part by weight of t-butyl peroxy-2-ethylhexanoate as a radical polymerization initiator, and the mixture was stirred sufficiently. The mixture solution in which the oxazine compound was dissolved had almost no change in color. The mixture solution was poured into a mold constituted by a glass sheet and a gasket composed of an ethylene-vinyl acetate copolymer, and cast polymerization was conducted. In the polymerization, an air oven was employed. Temperature was elevated gradually from 30° C. to 90° C. over 18 hours and was kept at 90° C. for 2 hours. After the completion of polymerization, the mold was taken out of the air oven and allowed to cool. Then, a cured product was taken out of the glass mold.

Each photochromic cured product(thickness: 2 mm)obtained above was measured for photochromic properties by the following methods, and the results are shown in Table 1.

(1) Density of developed color

The thus-obtained cured product(thickness: 2 mm) was irradiated with a beam emitted from a xenon lamp [L-2480 (300 W) SHL-100, a product of Hamamatsu Photonics Co., Ltd.] through Aero Mass Filter (a product of Corning Co., Ltd.) at 20° C.±1° C. with beam intensities of 2.4 mW/cm² (at 365 nm) and 24 :W/cm² (at 245 nm) on the surface of the cured product for 30 seconds or 120 seconds, to give rise to color development. Then,[$\epsilon(30$ or $120)-\epsilon(0)$] was determined and used as the density of developed color of the cured product. In this case, $\epsilon(30$ or $120)$ is an absorbance of the photochromic compound at its maximum absorption wavelength when the compound was irradiated for 30 seconds or 120 seconds under the above conditions to give rise to color development; and $\epsilon(0)$ is an absorbance of the photochromic compound before irradiation at the same wavelength. The initial density of developed color and initial developed color before a life test was conducted, were expressed by $T_o$.

(2) Initial coloring

Expressed by $\epsilon(0)$ which was measured under the above conditions. Incidentally, in the blue region of visible light, coloring can generally be clearly recognized by naked eyes when the absorbance exceeds 0.1.

(3) Durability

Fatigue durability was measured with a xenon fadeometer (FA-25AX-HC, a product of Suga Shikenki Co., Ltd.). Fatigue durability was expressed by a ratio of the absorbance of the products after irradiation at its maximum absorption wavelength when the cured products were irradiated with a xenon fadeometer for 200 hours and then allowed to develop a color by the method mentioned in the above (1), to the absorbance of the cured products before irradiation. In Table 1, the values of $A_{200}/A_o$ (%) of the $T_{200}$ corresponds to this fatigue durability.

TABLE 1

| No. | Epoxy Compound (Parts by weight) | Radical-polymerizablem monomers (parts by weight) | | $T_o$ | | $T_{200}$ | Initial coloring | |
|---|---|---|---|---|---|---|---|---|
| | | Polyfunctional (meth)acrylate(s) | Other monomers | Density of developed color | Color of Developed color | $A_{200}/A_0$ (%) | $\epsilon(0)$ | Color of initial coloring |
| 1 | GMA:10 | 3G:90 | — | 0.42 | Purple | 82.3 | 0.06 | No color |
| 2 | GMA:1 | 4G:99 | — | 0.56 | Purple | 80.2 | 0.05 | No color |
| 3 | GMA:30 | 3PG:70 | — | 0.68 | Purple | 78.5 | 0.04 | No color |
| 4 | GMA:9 | 3G:15, 4G:65 | MS:8, MSD:1, HEMA:2 | 0.48 | Purple | 85.0 | 0.04 | No color |
| 5 | GMA:9 | 3G:35, BP-2EM:48 | MS:7, MSD:1 | 0.48 | Purple | 88.0 | 0.05 | No color |
| 6 | GMA:10 | 3G:40, BR-MA:20 | MS:9, MSD:1, BzMA:20 | 0.45 | Purple | 78.0 | 0.05 | No color |
| 7 | GMA:10 | 4G:40, BR-MA:20 | MS:9, MSD:1, BzMA:20 | 0.50 | Purple | 79.3 | 0.05 | No color |
| 8 | GMA:10 | 3PG:60 | MMA:22, MS:7, MSD:1 | 0.42 | Purple | 80.3 | 0.05 | No color |
| 9 | GA:9 | 3G:15, 4G:65 | MS:8, MSD:1, HEMA:2 | 0.48 | Purple | 85.0 | 0.04 | No color |
| 10 | MGMA:9 | 3G:15, 4G:65 | MS:8, MSD:1, HEMA:2 | 0.48 | Purple | 85.0 | 0.04 | No color |
| 11 | MGA:9 | 3G:15, 4G:65 | MS:8, MSD:1, HEMA:2 | 0.48 | Purple | 85.0 | 0.04 | No color |
| 12 | BPMGMA:9 | 3G:15, 4G:65 | MS:8, MSD:1, HEMA:2 | 0.46 | Purple | 85.0 | 0.04 | No color |
| 13 | GBMA:4 | 3G:15, 4G:65 | MS:8, MSD:1, HEMA:2 | 0.48 | Purple | 85.0 | 0.04 | No color |
| 14 | GEHPMA:4 | 3G:15, 4G:65 | MS:8, MSD:1, HEMA:2 | 0.48 | Purple | 85.0 | 0.04 | No color |
| 15 | GIHPA:4 | 3G:15, 4G:65 | MS:8, MSD:1, HEMA:2 | 0.48 | Purple | 85.0 | 0.04 | No color |
| 16 | EGGE:4 | 3G:15, 4G:65 | MS:8, MSD:1, HEMA:2 | 0.52 | Purple | 85.0 | 0.04 | No color |
| 17 | PGGE:4 | 3G:15, 4G:65 | MS:8, MSD:1, HEMA:2 | 0.52 | Purple | 85.0 | 0.04 | No color |
| 18 | FDGE:4 | 3G:15, 4G:65 | MS:8, MSD:1, HEMA:2 | 0.50 | Purple | 85.0 | 0.04 | No color |
| 19 | HDGE:4 | 3G:15, 4G:65 | MS:8, MSD:1, HEMA:2 | 0.50 | Purple | 85.0 | 0.04 | No color |
| 20 | BGE:4 | 3G:15, 4G:65 | MS:8, MSD:1, HEMA:2 | 0.52 | Purple | 85.0 | 0.04 | No color |
| 21 | HDGE:4 | 3G:15, 4G:65 | MS:8, MSD:1, HEMA:2 | 0.52 | Purple | 85.0 | 0.04 | No color |
| 22 | GMA:10 | 3G:45, TEGDMA:45 | — | 0.42 | Purple | 82.0 | 0.06 | No color |
| 23 | GMA:10 | TEGDMA:45, 3EG:45 | — | 0.42 | Purple | 82.5 | 0.05 | No color |
| 24 | GMA:10 | BP-2EM:45, PRO-631:45 | — | 0.48 | Purple | 78.1 | 0.07 | No color |

*Density of developed color is a value after 30 seconds irradiation with a xenon lamp.

Example 2

The same operation as in Example 1 was conducted except that there were used the monomers and epoxy compound shown in No. 4 of Table 1 and the oxazine compound used in Example 1 was changed to an oxazine compound shown in Table 2. The results are shown in Table 2.

TABLE 2

| No. | Spiro-oxazine compound | Amount of spiro-oxazine added (parts by weight) | Density of developed color | Developed color | $T_{200}$ $A_{200}/A_0$ (%) | Initial coloring $\epsilon$ (0) | Color of initial coloring |
|---|---|---|---|---|---|---|---|
| 1  | SP1  | 0.04 | 0.56 | Blue purple | 81.5 | 0.04 | No color |
| 2  | SP2  | 0.04 | 0.53 | Blue purple | 84.2 | 0.1  | Light blue |
| 3  | SP3  | 0.04 | 0.54 | Purple      | 80.5 | 0.04 | No color |
| 4  | SP4  | 0.04 | 0.41 | Blue        | 78.8 | 0.04 | No color |
| 5  | SP6  | 0.04 | 0.40 | Purple      | 83.7 | 0.04 | No color |
| 6  | SP7  | 0.04 | 0.50 | Purple      | 81.0 | 0.06 | No color |
| 7  | SP8  | 0.04 | 0.54 | Blue purple | 81.4 | 0.1  | Light blue |
| 8  | SP9  | 0.04 | 0.58 | Blue purple | 82.0 | 0.1  | Light blue |
| 9  | SP10 | 0.04 | 0.71 | Purple      | 82.0 | 0.15 | Purple |
| 10 | SP11 | 0.04 | 0.35 | Blue        | 82.0 | 0.03 | No color |
| 11 | SP12 | 0.04 | 0.30 | Blue        | 82.0 | 0.04 | No color |
| 12 | SP1  | 0.01 | 0.08 | Blue purple | 85.0 | 0.01 | No color |
| 13 | SP1  | 0.15 | 0.70 | Blue purple | 68.1 | 0.07 | Light blue |

*Density of developed color is a value after 30 seconds irradiation with a xenon lamp.

Example 3

The same operation as in Example 1 was conducted except that there were used the monomers and epoxy compound shown in No. 4 of Table 1 and the photochromic compound used in Example 1 was changed to an oxazine compound, a fulgimide compound and a chromene compound all shown in Table 3. The results are shown in Table 3.

Example 5

The same operation as in Example 1 was conducted except that there were used the monomers and epoxy compound shown in No. 6 of Table 1 and the photochromic compound used in Example 1 was changed to an oxazine compound, a fulgimide compound and a chromene compound all shown in Table 5. The results are shown in Table 5.

TABLE 3

| No. | Spiro-oxazine compound | Amount of spiro-oxazine added (parts by weight) | Fulgide compound | Amount of fulgide added (parts by weight) | Chromene compound | Amount of chromene added (parts by weight) | Density of developed color | Developed color | $T_{200}$ $A_{200}/A_0$ (%) | Initial coloring $\epsilon$ (0) |
|---|---|---|---|---|---|---|---|---|---|---|
| 1 | SP5 | 0.03 | F2 | 0.1  | C2 | 0.04 | 0.83 | Gray  | 75.2 | 0.03 |
| 2 | SP6 | 0.03 | F2 | 0.1  | C2 | 0.02 | 0.80 | Gray  | 70.5 | 0.03 |
| 3 | SP8 | 0.05 | F1 | 0.03 | C1 | 0.04 | 0.70 | Brown | 77.5 | 0.1  |
| 4 | SP9 | 0.03 | F3 | 0.05 | C3 | 0.05 | 0.77 | Brown | 73.5 | 0.11 |

*Density of developed color is a value after 120 seconds irradiation with a xenon lamp.

Example 4

The same operation as in Example 1 was conducted except that there were used the monomers and epoxy compound shown in No. 5 of Table 1 and the photochromic compound used in Example 1 was changed to an oxazine compound, a fulgimide compound and a chromene compound all shown in Table 4. The results are shown in Table 4.

TABLE 4

| No. | Spiro-oxazine compound | Amount of spiro-oxazine added (parts by weight) | Fulgide compound | Amount of fulgide added (parts by weight) | Chromene compound | Amount of chromene added (parts by weight) | Density of developed color | Developed color | $T_{200}$ $A_{200}/A_0$ (%) | Initial coloring $\epsilon$ (0) |
|---|---|---|---|---|---|---|---|---|---|---|
| 1 | SP5 | 0.05 | F1 | 0.08 | C2 | 0.09 | 0.71 | Brown | 80.2 | 0.05 |
| 2 | SP6 | 0.05 | F2 | 0.05 | C2 | 0.04 | 0.88 | Gray  | 78.3 | 0.04 |
| 3 | SP8 | 0.04 | F2 | 0.04 | C1 | 0.05 | 0.80 | Gray  | 78.5 | 0.13 |
| 4 | SP9 | 0.03 | F3 | 0.05 | C3 | 0.05 | 0.80 | Brown | 73.5 | 0.11 |

*Density of developed color is a value after 120 seconds irradiation with a xenon lamp.

TABLE 5

| No. | Spiro-oxazine compound | Amount of spiro-oxazine added (parts by weight) | Fulgide compound | Amount of fulgide added (parts by weight) | Chromene compound | Amount of chromene added (parts by weight) | Density of developed color | Developed color | $T_0$ $T_{200}$ $A_{200}/A_0$ (%) | Initial coloring $\epsilon(0)$ |
|---|---|---|---|---|---|---|---|---|---|---|
| 1 | SP5 | 0.05 | F1 | 0.08 | C2 | 0.09 | 0.64 | Brown | 78.2 | 0.06 |
| 2 | SP6 | 0.05 | F2 | 0.05 | C2 | 0.04 | 0.78 | Gray | 75.7 | 0.06 |
| 3 | SP8 | 0.04 | F2 | 0.04 | C1 | 0.05 | 0.75 | Gray | 74.5 | 0.13 |
| 4 | SP9 | 0.03 | F3 | 0.05 | C3 | 0.03 | 0.76 | Brown | 72.5 | 0.09 |

*Density of developed color is a value after 120 seconds irradiation with a xenon lamp.

Comparative Example 1

The same procedure as in Example 1 was repeated using 0.04 part by weight of an oxazine compound shown in Table 6, except that no epoxy compound was used. In each of the composition Nos. 1–7 shown in Table 6, striking coloring occurred as a result of the mixing of an oxazine compound and a polyfunctional (meth)acrylate(s). The results are shown in Table 6.

Comparative Example 2

The same procedure as in Example 1 was repeated using 0.04 part by weight of an oxazine compound shown in Table 7, except that a purified polyfunctional (meth)acrylate was used and there was used no epoxy compound having at least one epoxy group in the molecule. In the composition No. 1 shown in Table 1, the mixing of an oxazine compound and a purified polyfunctional (meth)acrylate had no coloring, but its cured product had coloring. The results are shown in Table 7.

TABLE 6

| No. | Spiro-oxazine compound | Amount of spiro-oxazine added (parts by weight) | Radical-polymerizable monomers (parts by weight) Polyfunctional (meth)acrylate(s) | Other monomer | $T_0$ Density of developed color | Developed color | Initial coloring $\epsilon(0)$ | Color of initial coloring |
|---|---|---|---|---|---|---|---|---|
| 1 | SP5 | 0.04 | 3G:100 | — | Impossible to measure | No color development | 0.85 | Red purple |
| 2 | SP5 | 0.04 | 4G:100 | — | Impossible to measure | No color development | 0.90 | Red purple |
| 3 | SP5 | 0.04 | 3PG:70 | MMA:30 | Impossible to measure | No color development | 1.0 | Red purple |
| 4 | SP9 | 0.04 | 3G:100 | — | Impossible to measure | No color development | 1.0 | Purple |
| 5 | SP5 | 0.04 | 3G:50, TEGDMA:50 | — | Impossible to measure | No color development | 0.90 | Red purple |
| 6 | SP5 | 0.04 | TEGDMA:50, 3EG:50 | — | Impossible to measure | No color development | 0.95 | Red purple |
| 7 | SP5 | 0.04 | BP-2EM:50, PRO-631:50 | — | Impossible to measure | No color development | 0.83 | Red purple |
| 8 | SP5 | 0.04 | — | MMA:100 | 0.6 | Purple | 0.03 | No color |
| 9 | SP5 | 0.04 | — | BzMA:100 | 0.6 | Purple | 0.04 | No color |

*Density of developed color is a value after 30 seconds irradiation with a xenon lamp.

TABLE 7

| No. | Spirooxazine compound | Amount of purified spirooxazine added (parts by weight) | Purified Polyfunctional (meth)acrylate (parts by weight) | $T_0$ Density of developed color | Developed color | Initial coloring $\epsilon$ (0) | Color of initial coloring |
|---|---|---|---|---|---|---|---|
| 1 | SP5 | 0.04 | P1-3G:100 | 0.15 | Purple | 0.63 | Blue |
| 2 | SP5 | 0.04 | P2-3G:100 | 0.40 | Purple | 0.06 | No color |

*Density of developed color is a value after 30 seconds irradiation with a xenon lamp.

We claim:

1. A process for producing a color-reduced composition for the production of a photochromic thermo-cured product free from initial coloring, which comprises mixing a photochromic spirooxazine compound, a polyfunctional (meth)acrylate containing an initial-coloring effective amount of impurities which cause coloring in contact with the photochromic spirooxazine compound, a heat-polymerization initiator, and a compound having at least one epoxy group in the molecule to form the color-reduced composition, said heat-polymerization initiator being selected from the group consisting of diacyl peroxides, peroxyesters and peroxycarbonates.

2. A process according to claim 1, wherein the polyfunctional (meth)acrylate monomer is at least one monomer selected from the group consisting of monomers represented by the following formula (1):

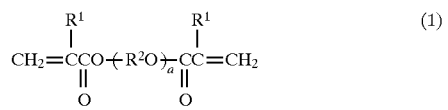

wherein $R^1$ is a hydrogen atom or a methyl group, $R^2$ is an alkylene group having 2 to 4 carbon atoms, and a is an integer of 1 to 10, monomers represented by the following formula (2):

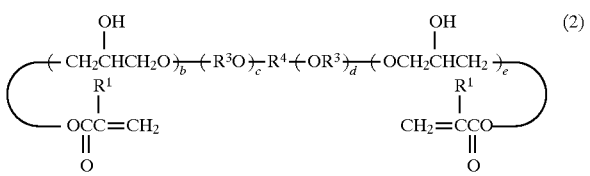

wherein $R^1$ is a hydrogen atom or a methyl group; $R^3$ is an ethylene group or a propylene group; b, c, d and e are each an integer of 0 to 10; when b, c, d or e is

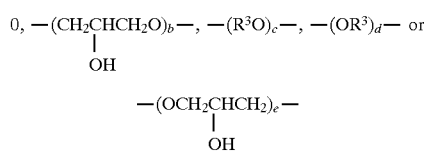

is a single bond; $R^4$ is an alkylene group having 3 to 10 carbon atoms or a group represented by the following formula

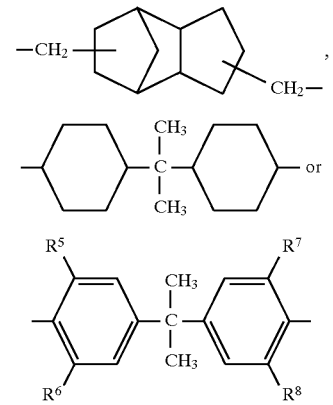

in which $R^5$, $R^6$, $R^7$ and $R^8$ may be the same or different and are each a hydrogen atom or a halogen atom other than fluorine, and monomers represented by the following formula (3):

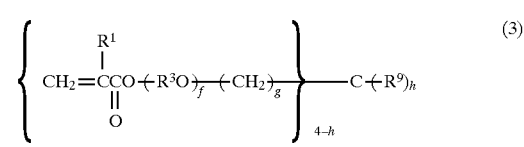

wherein $R^1$ is a hydrogen atom or a methyl group; $R^3$ is an ethylene group or a propylene group; f is an integer of 0 to 10; g is 0 or 1; when g is 0, —$(CH_2)_g$— is a single bond; h is an integer of 0 to 2; $R^9$ is a hydrogen atom, a hydroxymethyl group or an alkyl group including methyl and ethyl.

3. A process according to claim 1, wherein the compound having at least one epoxy group in the molecule is a compound represented by the following formula (4):

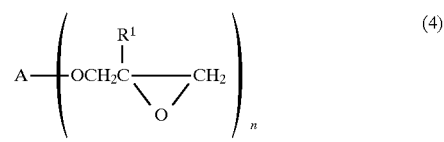

wherein A is a residue of an n-valent alcoholic hydroxyl group-containing compound, a residue of an n-valent phenolic hydroxyl group-containing compound, or a residue of an n-valent carboxylic acid; $R^1$ is a hydrogen atom or a methyl group; and n is an integer of 1 to 4.

4. A process according to claim 1, wherein the compound having at least one epoxy group in the molecule is a compound represented by the following formula (5):

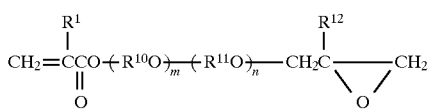

(5)

wherein $R^1$ and $R^{12}$ are each a hydrogen atom or a methyl group; $R^{10}$ and $R^{11}$ may be the same or different and are each an alkylene group of 1 to 4 carbon atoms which may be substituted with a hydroxyl group(s), or a group represented by the following formula

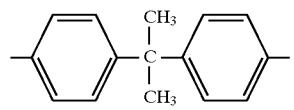

and m and n are each 0 or 1.

5. A process according to claim 1, wherein the photochromic spirooxazine compound is a compound represented by the following formula (6):

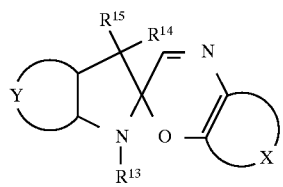

(6)

wherein $R^{13}$, $R^{14}$ and $R^{15}$ may be the same or different and are each an alkyl group, a cycloalkyl group, a cycloaralkyl group, an alkoxy group, an alkyleneoxyalkyl group, an alkoxycarbonyl group, an alkoxycarbonylalkyl group, an aryl group, an aralkyl group, an aryloxy group, an alkylenethioalkyl group, an acyl group, an acyloxy group or an amino group; $R^{14}$ and $R^{15}$ may together form a ring; $R^{13}$, $R^{14}$ and $R^{15}$ may each have a substituent(s); and the portions represented by the following formula

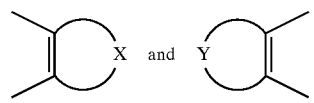

are each independently a substituted or unsubstituted aromatic hydrocarbon group or a substituted or unsubstituted unsaturated heterocyclic group.

6. A process according to claim 1, wherein the polyfunctional (meth)acrylate monomer and the compound having at least one epoxy group in the molecule are mixed first, then the photochromic spirooxazine compound is added thereto.

7. A process according to claim 1, wherein the composition further contains at least one monomer selected from the group consisting of monofunctional (meth)acrylates and aromatic vinyl compounds.

8. A process for producing a color-reduced composition for the production of a photochromic thermo-cured product free from initial coloring, which comprises mixing a photochromic compound consisting of a spirooxazine compound, a polyfunctional (meth)acrylate containing an initial-coloring effective amount of impurities which cause coloring in contact with the photochromic spirooxazine compound, a heat-polymerization initiator, and a compound having at least one epoxy group in the molecule to form the color-reduced composition, said heat-polymerization initiator being selected from the group consisting of diacyl peroxides, peroxyesters and peroxycarbonates.

* * * * *